July 4, 1933.　　　　M. PRESSLER　　　　1,916,283

SPEED CHANGE TRANSMISSION

Filed Nov. 30, 1931　　　4 Sheets-Sheet 1

Marcel Pressler
INVENTOR

BY Julian J. Wittels
his ATTORNEY

July 4, 1933. M. PRESSLER 1,916,283
SPEED CHANGE TRANSMISSION
Filed Nov. 30, 1931 4 Sheets-Sheet 3

Marcel Pressler
INVENTOR-
BY Julian J. Wittel,
his ATTORNEY-

July 4, 1933.    M. PRESSLER    1,916,283
SPEED CHANGE TRANSMISSION
Filed Nov. 30, 1931    4 Sheets-Sheet 4
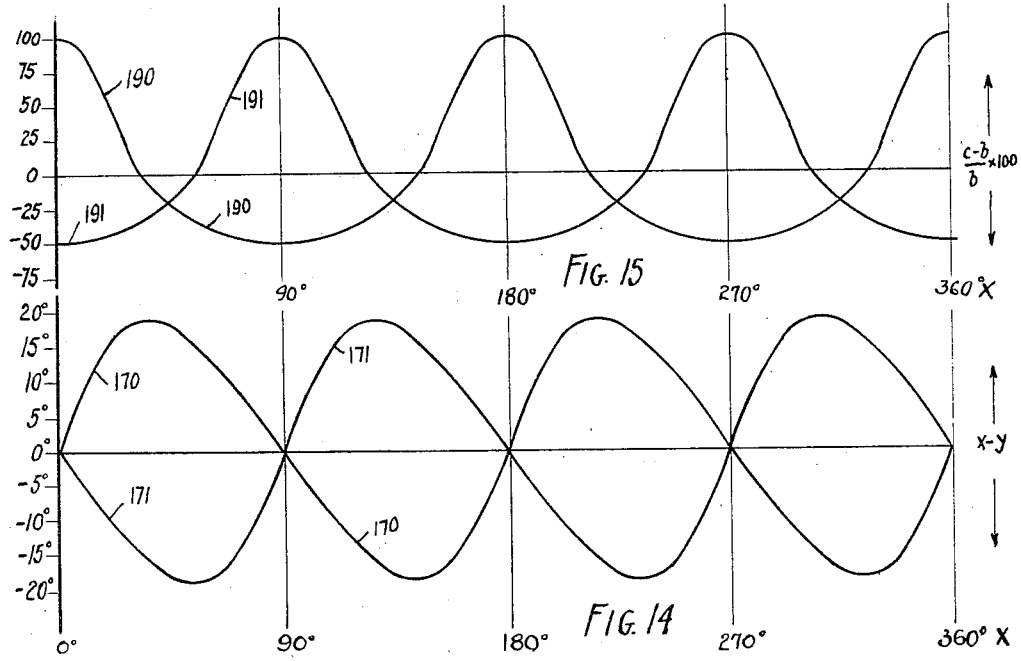
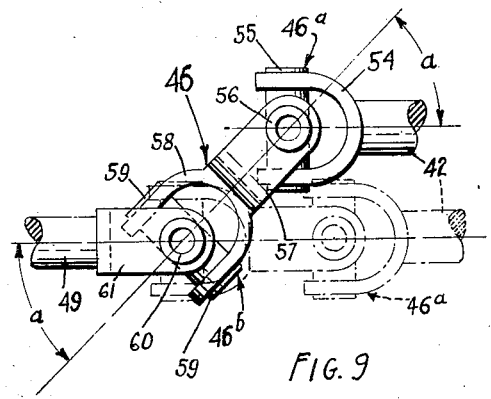
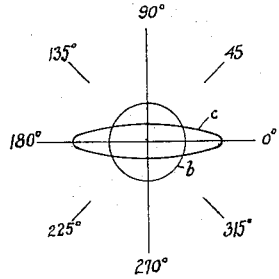
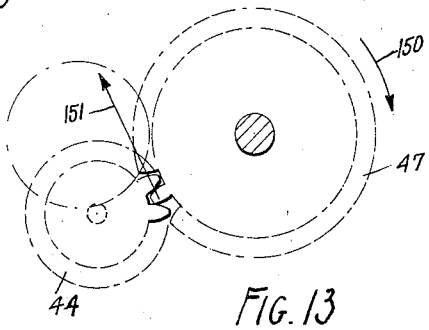
Marcel Pressler
INVENTOR
BY Julian J. Wittel,
his ATTORNEY Patented July 4, 1933

1,916,283

UNITED STATES PATENT OFFICE

MARCEL PRESSLER, OF NEW YORK, N. Y.

SPEED CHANGE TRANSMISSION

Application filed November 30, 1931. Serial No. 578,065.

This invention relates to devices for transmitting rotary motion and has for its main object to provide means whereby the rotary motion of a shaft may be transmitted to another shaft or to a similar driven element, driven in a continuous manner by novel means so that the speed of said driven element may be increased gradually from zero to a certain maximum.

Another object of this invention is to provide a device of the type mentioned whereby the relation of the speed produced on the driven element to that of the driving element may be automatically controlled by the device itself preferably so, as to impart no motion to said driven element until driving element attains a certain minimum speed, and in the range of higher speeds of the driving element to increase gradually said relation from zero to a certain maximum with increasing speeds of the driving element.

Still another object of this invention is to provide a device as characterized hereinbefore in which the relation of speed of the driven member to that of the driving member automatically decreases as the load on the driven member increases, thereby keeping the load on the driving member virtually constant and independent from the load on the driven member.

A further object of my invention is to provide a rotary motion transmission device in which the speed of the driven element in relation to that of the driving element may be easily and continuously controlled by an operator from the outside without interrupting the operation of the device.

Still a further object of my invention is to provide in a device as characterized hereinbefore simple and efficient means whereby the direction of rotation of the driven member may be reversed, said reverse motion showing all the important characteristics recited hereinbefore in relation to the normal "forward" motion.

Other objects of my invention will be apparent as the specification of the same proceeds and among others are: to provide a device for the objects mentioned, which will be comparatively simple and inexpensive; which may easily be installed in existing mechanisms; which will be efficient, reliable and of smooth continuous operation, having means to provide automatically against excessive speeds of the driving member or overloading of the driving mechanism.

In the drawings forming a part of this specification and being attached heretofore:

Fig. 3 is a transverse section of my device on the line 3—3 of Fig. 1;

Fig. 9 is a detail elevation of a double universal joint used in my device.

Fig. 10 is a diagram showing the speed relation of the two shafts connected to said universal joints;

Fig. 11 is a fragmentary detail showing the guide slots for a control arm.

Fig. 13 is a diagram to indicate the tendency of my device to slow down the transmitted speed when the load on the driven shaft increases.

Figs. 14 and 15 are further diagrams to illustrate conditions in connection with the operation of my device.

Figure 1:
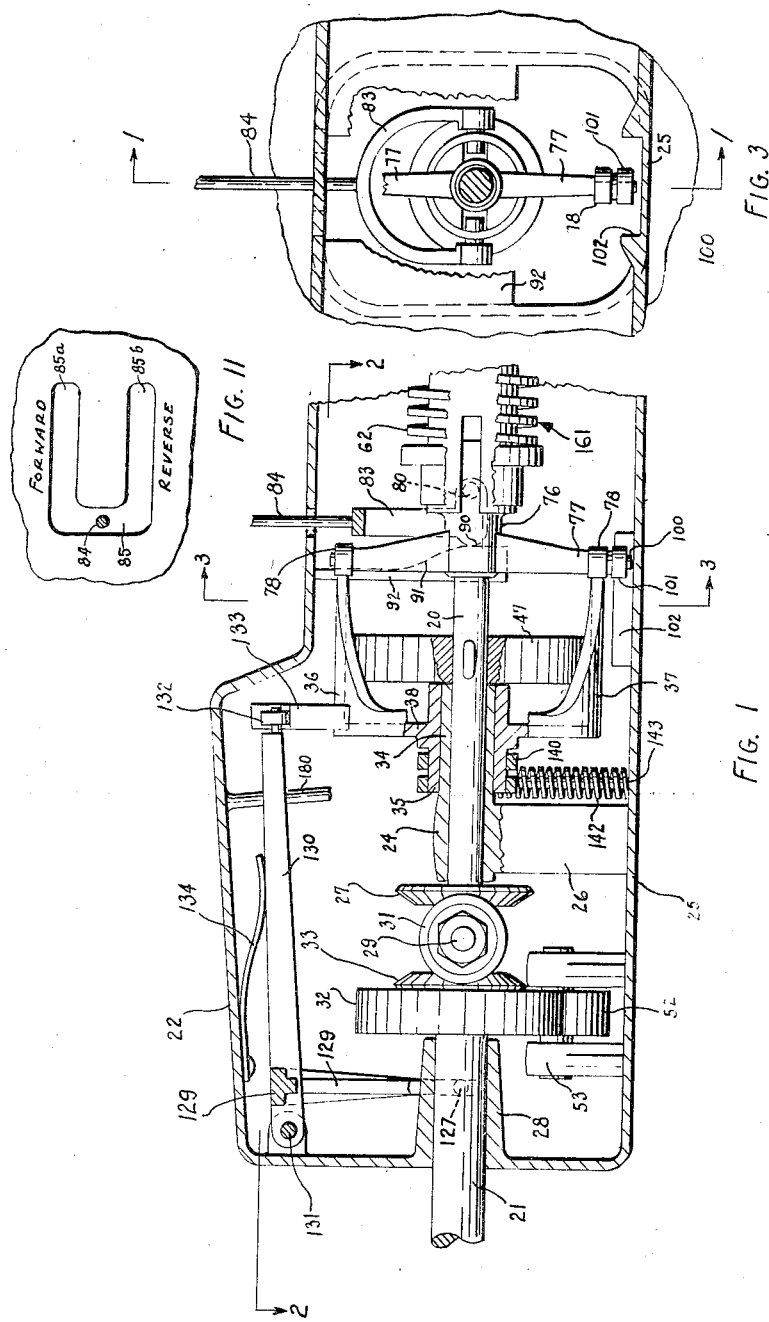
Fig. 1 is a partial sectional elevation of my device, in the line 1—1 of Fig. 2.

Referring now to the drawings more closely by characters of reference, the numeral 20 indicates a rotary shaft driven by any source of power, while the numeral 21 indicates another rotary shaft being in axial alignment with the shaft 20 and which it is intended to drive by said shaft 20. I assume that shaft 20 rotates in the direction of arrow 113 shown on the right hand end of Fig. 2. Around the adjacent end portions of said shafts and inter-connecting the same is built my transmission and speed change device which preferably is enclosed in housing 22.

Shaft 20 enters said housing in about the central line thereof supported by the bearing 23 and is continued therein towards the left hand portion of the same (Figs. 1 and 2), its inner end being supported in a bearing 24, secured to and resting on the bottom 25 of housing 22 in a standard 26 and carrying a bevel gear 27.

The inwardly projecting right hand end portion of shaft 21 is supported in a bearing 28 and carries an integral cross-piece 29 at its inner termination. Two bevel gears, 30 and 31, are loosely rotatable on the ends of said cross-piece and mesh with gear 27. A larger spur gear 32, is also provided in a loosely rotating manner on shaft 21 between bearing 28 and cross piece 29, and has integral therewith a bevel gear 33 of the same characteristics as gear 27 and also meshing with gears 30 and 31.

Figure 6:
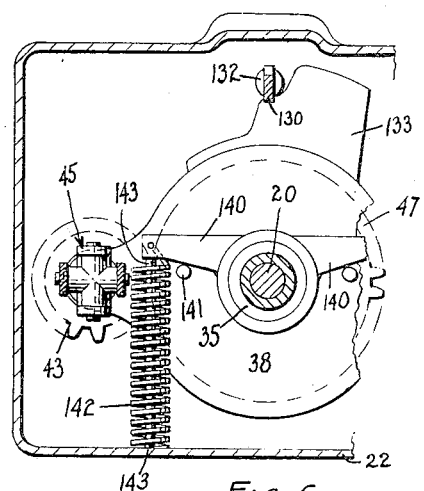
Fig. 6 is a similar section on line 6—6 of Fig. 2.

The right hand end 34, of the bearing 24 (Fig. 1) is cylindrical and a sleeve 35 is rockable therearound said sleeve being extended upwardly and downwardly into castings 36 and 37, respectively. The front portions of said castings 36 and 37, are united with said sleeve 34 by a disk 38, (Figs. 1 and 6) the horizontally transversal ends of which are formed into journal bearings 39 and 40, (Fig. 2) in which are rotatable shafts 41 and 42, carrying at their right hand ends the gears 43 and 44, secured thereon and at their left hand ends, the respective elements of double universal joints 45 and 46, (to be described hereinafter and shown in Fig. 9). A larger spur gear, 47, is keyed on shaft 20 in mesh with gears 43 and 44.

The left hand ends of each in series connected pair of universal joints, 45 and 46, is continued in shafts 48 and 49, carrying gears 50 and 51. Shafts 48 and 49 are supported in bearings 18 and 19 which are integral parts of housing 22.

Figures 7, 8, 12:
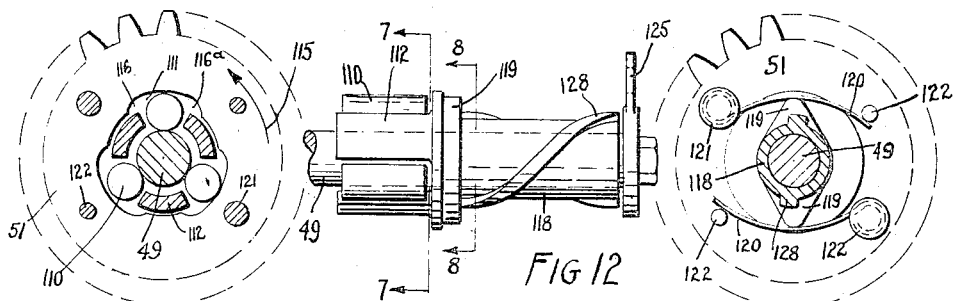
Fig. 7 is a detail sectional view taken on line 7—7 of Fig. 2.
Fig. 8 is a similar sectional elevation on line 8—8 of Fig. 2.
Fig. 12 is a detail showing a screw thread keyed sleeve for the control of a clutch mechanism in my device.

The connection between the driven universal joint shaft 49, and the gear 51 is illustrated somewhat diagrammatically in the sectional elevation of Fig. 7. Gear 51 is loose around shaft 49 and rollers 110 are interposed between the two, said rollers playing in recesses 111 in the bore of gear 51. Fingers 112 reach between the rollers 110, said fingers being adapted to be rotated or rocked around the shaft 49. While operating the transmission said shaft 49 will be driven with a variable angular velocity in the direction of arrow 115 as explained hereinafter.

Now in order to secure a driving connection between shaft 49 and gear 51, the fingers 112 will have to be moved in the direction of arrow 115, which I prefer to call "forward" direction, thereby pressing rollers 110 into the left hand corners 116 of recesses 111 and it will be obvious that the mentioned rotation of shaft 49 will cause said rollers to wedge in and so provide a firm connection between gear 51 and the shaft so that in such a position of the fingers 112, the shaft will drive the gear 51 in the direction of arrow 115. Should, however, the gear rotate faster than the shaft, as it will happen under conditions hereinafter described, at certain phases of every rotation, the gear will run idly therearound, as will be obvious by inspecting the Fig. 7.

Figure 2:
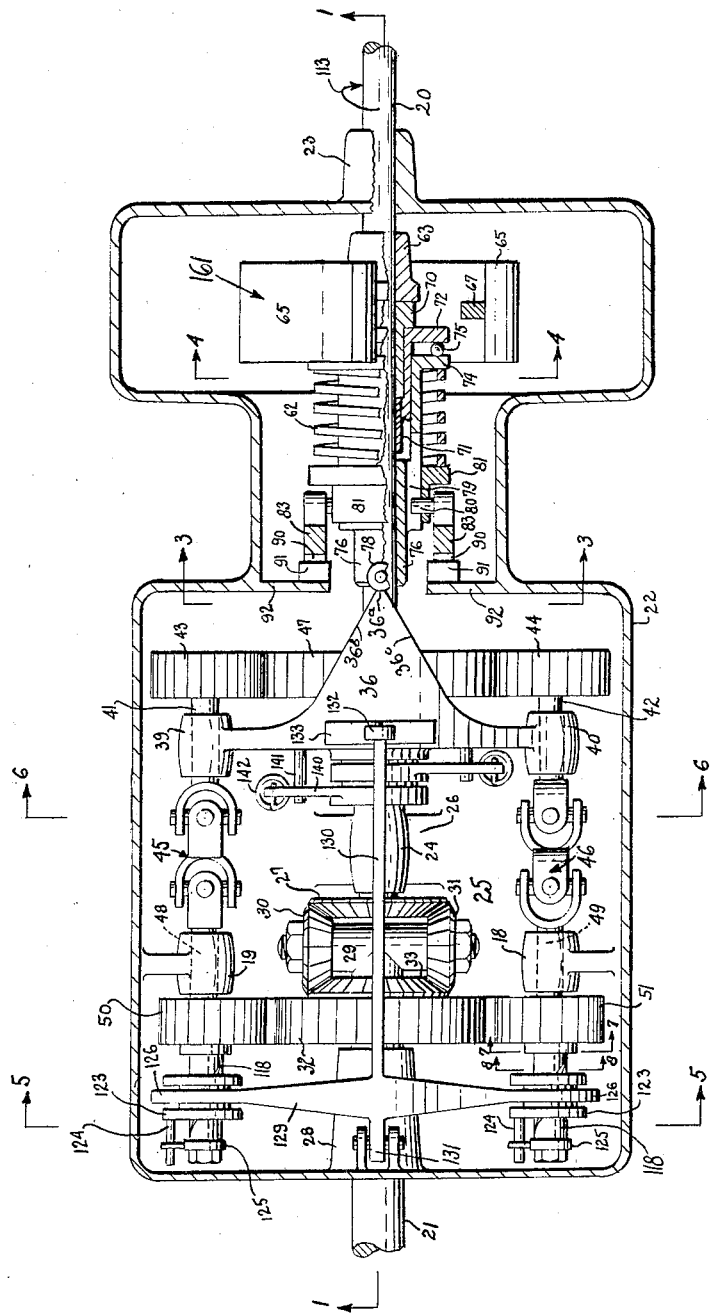
Fig. 2 is a section similar to that of Fig. 1, but transverse thereto, the section being taken on line 2—2 of Fig. 1.

Fingers 112 are now arranged on a sleeve 118, which is rotatable around shaft 49, (Figs. 2, 8 and 12). Two projecting cam arms 119 (Fig. 8) may also be provided on a flange of sleeve 118, cooperating with springs 120 secured on pins 121 on gear 51 and being held in tension by resting against other pins 122 on said gear so that sleeve 118 will be frictionally held in its inactive position with fingers 112 holding the rollers in their neutral central positions, as shown in Fig. 7. In order to move fingers 112 in the direction of arrow 115 to wedge rollers 110 into the recesses of gear 51, to establish connection between said gear 51 and shaft 49, sleeve 118 will have to be turned in relation to shaft 49 which may be done by any of the usual means, well known in the art, one of such means being shown in the drawings in a diagrammatic manner and being as follows: A second sleeve 123 is arranged around the center part of sleeve 118, (Figs. 2 and 5) slidable therealong and being prevented from rotation in relation to shaft 49 by a pin 124, projecting therefrom and playing in a slot in disks 125, secured at the end of shaft 49.

Sleeve 118 shows screw thread keys 128 which engage corresponding grooves in sleeve 123 so that the longitudinal movement of sleeve 123 will turn sleeve 118 and with it fingers 112 in relation to shaft 49. Springs 120 will assist in such a turning of sleeve 118 and will keep it in its changed position through pressing on cam arms 119.

It is to be understood that gears 50 and 51 are not directly in mesh with gear 32 but intermediate gears 52 (Figs. 1 and 5) are interposed between them and said large gear 32, at the two sides thereof, the shafts of said intermediate gears being journalled in bearings 53 secured on the bottom of the casing of my device and it is obvious that by the gearing arrangement just described and by moving the fingers of the hereinbefore mentioned one way idler in the "forward" position, said gear 32 will be driven in an opposite direction to that of shaft 20, so that bevel gears 27 and 33 at the ends of shafts 20 and 21 will rotate in opposite directions. Same effect can be produced by an alternate construction of linking gears 32, 50 and 51 by a sprocket chain, thus eliminating gears 52. The use of connecting rods and crank arms instead of gears for interconnecting shafts 48, 49 and 21 would offer still another solution, thus eliminating gears 50, 51, 52 and 32. In this case however gears 43, 44 and 47 must have equal pitch diameters.

The construction of the double universal joints, hereinbefore generally indicated by the numeral 45 and 46 respectively, and each of them consisting of a pair of universal joints connected in series is shown in Fig. 9; the joints shown therein being the ones indicated by the character 46 and the construction of joints 45 is entirely identical. Their relative arrangement however is such that joints 46 are lagging with a phase of 90 degrees against joints 45.

According to said Fig. 9 shaft 42 has the right hand end of the right hand universal joint, generally indicated by the numeral 46a, integral therewith, in the form of yoke 54 which rocks on cross pins 55, said pin being integral with a transverse cross pin 56, around which a left hand yoke 57 of universal joint 46a may oscillate.

A right hand yoke 58 of a similar left hand universal joint 46b is secured to, or integral with left hand yoke 57, being transverse in plane thereto, and pins 59 and 60 and left hand yoke 61 of universal joint 46b form a joint similar to that indicated by 46a, said last mentioned yoke being secured to or integral with the shaft 49.

Normally the two universal joints of said double joint 46 are in axial alignment with one another, as shown by the imaginary dot and dash representation in Fig. 9, and in such a case the speed of rotation of shaft 42 will be without any variation transferred to shaft 49, as will be obvious to those versed in this art. Inasmuch as the pitch-diameter-ratio of gear 44 to 47 is equal to that of 51 to 32; e. g.— the gear proportion on the right and left hand sides of said joints are equal, bevel gears 27 and 33 will rotate with equal speeds, but in reverse directions as has been pointed out hereinbefore.

It is now also obvious to those versed in this art, that in such a case the gears 30 and 31 will idly rotate at the ends of cross pin 29 and shaft 21 will not rotate at all, but its speed will be zero.

With the arrangement shown and described shaft 21 will receive a rotary movement only in case there is a difference between the speeds of bevel gears 27 and 33, in which case gears 30 and 31 will travel around on gear 33 and cause cross pin 29 and shaft 21 to rotate, its speed being one half of the difference of the speeds of gears 27 and 33 and in the direction of the larger one of said two speeds.

To produce a speed difference between the gears 27 and 33, I move the two units of each double universal joint 45 and 46 out of axial alignment as shown by the full line portion of Fig. 9 and by means to be described hereinafter. Fig. 9 shows a 45 degree deviation between the axes of the two units, though any other deviation may be produced between them, within certain practical limits. The deviation between the two axes is generally indicated by the letter "a". It will be obvious by inspecting Fig. 9 that shafts 42 and 49 remain in parallelism with one another.

Under the conditions herein described and upon a deviation "a" between the units of said joints, shaft 49 will not receive any more an equal speed to that of shaft 42 but assuming an even speed or angular velocity for shaft 42, the angular velocity of shaft 49 will be highly variable, at certain portions of one revolution being higher than that of shaft 42 and at other portions being lower. The relation of the speeds of shafts 42 and 49 during one rotation thereof is illustrated by the diagrams drawn in polar coordinates in Fig. 10, for a certain angular deviation "a", the even speed of shaft 42 being indicated for the 360 degrees of one rotation by the circle "b", while the corresponding speeds of shaft 49 will then give the elliptical diagram "c".

Now in the case shaft 49 is put in driving connection with gear 51 by moving the fingers of the hereinbefore mentioned one way idler in the "forward" position, said bevel gear 33 will receive the mentioned higher speeds only of shaft 49, because at lower speeds of shaft 49 the combined kinetic energy of gears 32, 51 and 52, (the moment of inertia of which can be suitably increased with adequate masses built into said gears) will tend to carry forward gear 51 temporarily with a higher speed than that of shaft 49, thereby one way idler releases shaft 49. So average speed of bevel gear 33 will be higher than the speed of gear 27 and cross piece 29 and shaft 21 will begin to rotate in one direction which I prefer to call "forward" direction.

To equalize the speeds of the driven gears, resilient elements permitting a limited relative twist between interconnected rotating members may also be interposed, as is well known in the art, and finally two or more universal joint drives may be employed with phase differences to one another, two such units being shown in the drawings in opposite phases so that one will give the highest speed to its driven gear when the other has its lowest speed.

The said deviations "a" in the axial lines of the universal joints is obtained by the disk 38 and castings 36 and 37 being rocked or moved around the bearing portion 34, by the sleeve 35 (Fig. 1), said rocking to a desired extent causing a corresponding displacement of bearings 39 and 40, respectively, shafts 41 and 42, and the respective universal joint units.

The larger the deviation "a", the larger will be the speed of variation in the shaft 49 and the larger will be the speed of gear 33 and ultimately of shaft 21 in relation to that of shaft 20. Said speed relation between the two shafts under practical conditions may be made to be any figure between zero and a certain maximum, which is determined by the construction of said universal joints, that is by the maximum possible deviation, "a".

The rocking of castings 36 and 37 around shaft 30 may be executed automatically, according to the magnitude of speed of the driving shaft 20.

Figure 4:
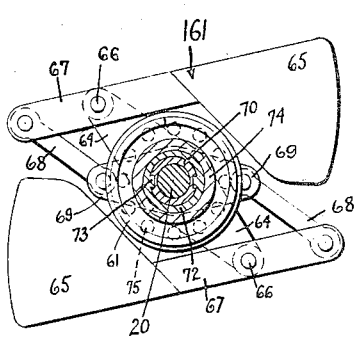
Fig. 4 shows the detail construction of a centrifugal governor and is a section taken on line 4—4 of Fig. 2.

For this purpose a centrifugal governor device is shown at the right hand end of the housing of my device, generally being indicated by the numeral 161. (Figs. 1, 2 and 4). A hub 63 is keyed on shaft 20 having two arms 64. Centrifugal weights 65 are pivoted on said arms, as at 66, by arms 67, and links 68 connect the outer end of said arms 67 to arms 69. Arms 69 are integral with sleeve 70 which is rotatable around shaft 20 but is prevented from axial motion by the stop ring 71 fast on said shaft. It is obvious that if weights 65 fly outward under the influence of higher speeds of shaft 20, sleeve 70 will be rocked around said shaft in a counter clockwise direction, as shown on Fig. 4.

A second sleeve 72 provided around sleeve 70 is being prevented from rotation in relation to the shaft 20 but is permitted to move axially by one of the means known in the art, as by stop ring 71 having slot and key engagement with the left hand end of sleeve 72. A helical screw groove and key engagement 73 is also provided between sleeves 70 and 72 so that a rocking of sleeve 70 will cause an axial movement of sleeve 72.

A third sleeve 74 is finally arranged around sleeve 72, rotatable and axially slidable in relation thereto and a ball bearing 75 may be interposed between appropriate flanges of the said sleeves so that an axial motion of sleeve 72 may easily be transmitted to sleeve 74 while the two are rotating in relation to one another.

Sleeve 74 is continued in sleeve 76, integral therewith, and carrying arms 77 which have rollers 78 at their outer ends.

Said sleeve 74 also shows to oppositely placed slots 79 in which may play pins 80, set rotatably in an outermost ring or sleeve 81. A spring 62 is interposed between appropriate flanges on sleeves 74 and 81.

A yoke 83 carries said pins 80 and an arm 84 of said yoke device projects outside of the housing and may play in slot 85 in the top thereof. (Fig. 11.)

Normally each roller 78 is opposite the respective apex 36a and 37a of the castings 36 and 37 in such position the universal joints are axially aligned and there is no deviation "a" so that shaft 21 will not be driven, no matter what speeds shaft 20 may show. If, however, arm 84 is moved in slot 85 in a transverse direction, toward the mark "forward"

(Fig. 11) it will rock sleeve 76 and place roller 78 along the side 36b of casting 36.

To limit the rocking of sleeve 76, which is integral with arm 77, a downward extension 100 of arm 77 is provided (Figs. 1 and 3) carrying a second roller 101, the oscillation of which is limited in either direction by the upstanding walls 102 on the bottom of the housing of my device.

In case of an axial movement of sleeve 76 said walls 102 are acting as guides to secure a straight linear motion for rollers 78.

A certain amount of speed of shaft 20, depending on the tension of spring 62 will cause said roller 78 to travel forward and rock casting 36 and its associated parts in the desired direction, producing the mentioned deviation "a" in the universal joint and causing my device to transmit a certain speed to shaft 21, as has been described hereinbefore.

The proportion of the amount of speed transmitted by the universal joint to that of shaft 20 may be controlled by the profile of the side 36b as one factor thereof and generally said proportion will increase upon the increase of the speed of shaft 20.

It is obvious that the speed of shaft 20 at which the roller 78 begins to travel along the edge 36b, ending the idling of shaft 21, depends on the tension of spring 62 and its travel and so the deviation "a" produced in the universal joints will also depend on said tension, whereby the proportion of speed transmission may be controlled by said tension. Generally, the higher said tension the higher will be the speed up to which my device will remain idle, and the lower will be the proportion of the speed transmitted to that of the shaft 20.

In order to enable an outside operator to control said starting speed and said proportion, I provide cam surfaces 90 at the lower forward ends of the yoke 83 which are in engagement with projecting curved wall surfaces 91 built into the sides of housing of my device, at about the opposite portion thereof, as at 92. (Figs. 1, 2 and 3.)

It will now be obvious by inspecting Fig. 1 that if arm 84 is rocked backward cam surface 90 will ride upward on curved surface 91, the yoke pivoting on pins 80, and said pins are permitted to move towards said walls 91, taking with them the sleeve 81 and thereby reducing the tension of the spring 62. In this manner the speed transmitting characteristics of my device may be manually influenced. To permit a longitudinal rocking of arm 84, the slot 85 is extended backward as at 85a (Fig. 11), and any usual means, like a spring locked ratchet, may be used to lock the arm 84 in its various positions, as is well known in this art.

Figure 5:
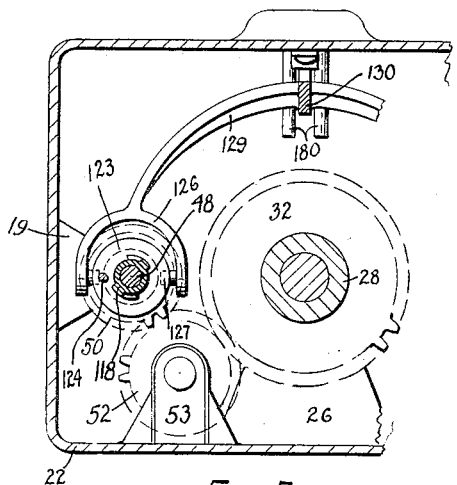
Fig. 5 is a fragmentary section of my device on the line 5—5 of Fig. 2.

In order to enable outside operator to reverse direction of speed of driven shaft 21, the action of the one way idler mentioned hereinbefore, is made reversible by yoke 126. (Figs. 2 and 5). Yoke 126 embraces sleeve 123 engaging a circular groove therein by pin 127 slidable in said groove and it is obvious that said yoke may move sleeve 123 in a forward or backward direction while permitting its rotation with the shaft 48. One yoke 126 is provided for each of the gears 50 and 51 at the two sides of my device and the two yokes are connected by an arched transverse casting 129 integral therewith being a longitudinal operating lever 130 pivoted at one end, as, at 131. Said lever is guided between two pins 180 extending downward from the top part of housing 22, and carries a roller at its inner end at 132. Said roller 132 rides on a cam 133 integral with disk 38 and castings 36 and 37, (Fig. 8), and said lever 130 is pressed downward by a spring 134, (Fig. 1). It is obvious that upon the rocking of disk 38, in one or other direction roller 132 will ride upward or downward on cam 133 and will rock yokes 126 in a corresponding manner, moving sleeve 123 and rocking sleeve 118 and its fingers 112 in one or other direction. In the arrangement shown when roller 78 rides on "forward" side 36b of casting 36 fingers 112 will move as shown by arrow 115 and will lock the shaft 49 to gear 51 as described for the "forward" movement.

If it is desired to reverse the speed of my transmission, fingers 112 will have to be moved in the reverse direction, by setting control arm 84 in the reverse direction, by setting control arm 84 in the reverse branch 85b of slot 85 marked "reverse" thereby letting roller 78 travel on edge 36c of casting 36 which will cause a rocking of disk 38 in the reverse direction. The movement of disk 38 and cam 133 which is integral with said disk 38 will produce a corresponding movement of lever 130, of yokes 126 and of moving sleeve 123 which in turn will move rocking sleeves 118 and their fingers 112 in opposite directions to arrow 115. Likewise the deviation "a" in the universal joints will be in the opposite direction to the one before, but its effect on speed of shafts 48 and 49 will be the same. The hereinbefore mentioned rocking of fingers 112 in the reverse direction will lock or wedge roller 110 in the opposite corners 116a of recesses 111 and it will be obvious that now the shaft 49 will not drive gear 51, but will temporarily limit the angular velocity of gear 51 which is now driven through gears 32 and 52 by the reaction of the load-torque, which reaction is exerted on bevel gear 33. This temporary limitation of speed of gear 51 occurs in time intervals when the angular velocity of shaft 49 is below the velocity of shaft 42. In time intervals of an increased speed of gear 49, the combined kinetic momentum of gears 32, 51 and 52 will counteract a substantial angular acceleration of gear 51 and will cause it to lag behind shaft 49 thereby releasing the one way idler. Gear 33, therefor, will have a smaller average speed than gear 27 and the cross piece 29 and shaft 21 will rotate in the reverse direction to the one described for the "forward" conditions.

Disk 38 with castings 36 and 37 normally are kept in a central neutral position by two arms 140 loosely rotatable around the hub 35 of disk 38, (Figs. 1, 2 and 6) and each engaging a pin 141 on said disk. The end of each arm 140 is engaged by a spring 142 secured to the bottom of my housing and a rod 143 is also secured into said bottom within each spring, on the upper end of which said arm normally rests, preventing a further downward movement of the arm. This construction will always tend to return the disk 38 and its associated parts into the neutral position.

Outside of the action of the hereinbefore described spring mechanism, the disk 38 has an automatic tendency to return to its neutral position as soon as the driven shaft 21 is loaded. The intensity of this tendency is proportional to the sum of the load torques on shafts 20 and 21 and will cause an adjustment of the transmission ratio. Referring to Fig. 13, which shows a diagram of gears 44 and 47, if gear 47 is driven in the direction of arrow 150 and the drive is "forward" as explained hereinbefore, the tangential force indicated with arrow 151, will tend to move gear 44 upwards, that is towards the neutral position, when the load on shaft 21 increases. My device, therefore, will automatically slow down the rate of transmission upon the increase of the load.

If I examine the operation of the device, I will find that the same tendency will develop in the opposite direction in case of the "reverse" drive. Inasmuch as the displacement of gear 44 will be in the opposite direction too, the effect upon the transmission ratio will be the same as in the "forward" drive.

In order to prevent an independent movement of shaft 21 from that of shaft 20, gear 32 may be brought into a kinetically locked condition with gear 47 through some additional gearing arrangement, which is put into operation at certain transmission ratios thereby rendering the universal joint drive inoperative. This may be effected automatically by utilizing the axial movement of sleeve 76 for the execution of this operation.

In Fig. 14 a diagram is shown illustrating for the two double universal joints 45 and 46 the relative angular displacements of their respective driving and driven shafts, during one revolution. The curve 170 is for one double universal joint and the curve 171 is for the other, the phase difference being 90 degrees, and if one shaft during a revolution made $x$ degrees from its starting point, and the other $y$ degrees, the ordinates of the curve show the values of $x-y$ for all the $x$ angles in one revolution from zero to 360 degrees, which are shown as abscissæ. This curve gives a clear picture of the advance and retardation of the driven shaft (48 and 49) in relation to the driving shaft (41 and 42).

In Fig. 15 are shown two diagrams for the two universal joint drives 45 and 46, showing the percentage relations of the differences in driven and driving speeds to the driving speeds at the respective moments during one revolution. Diagram 190 is for one drive, diagram 191 for the other. The abscissæ are the $x$ angles of the driving shaft (41 and 42) during one revolution. If the driven speed is "$c$" as designated for shaft 49 hereinbefore and the driving speed is "$b$", as described for shaft 42 hereinbefore, then the ordinates are $$\frac{c-b}{b} \times 100$$

that is the percentage relation of said difference to the driving speed. These diagrams show the driven speeds on shafts 48 and 49 before the one way clutch in gears 50 and 51, the inertia masses and the resilient members have their neutralizing and selecting effects on driving and the driven speeds.

To summarize, therefore, my transmission is self-adjusting, adapting automatically the transmission ratio to the load-torque and to the speed of the driving mechanism in a predetermined manner. Through proper proportioning of certain elements of the transmission its operating characteristics can be made such as to correlate certain required transmission ratios to certain driving speeds and certain load-torques. During operation of the transmission the direction of speed of the driving shaft can be reversed and within certain limits the characteristics of the device can be modified at the desire of the operator.

I also want it to be understood that changes and variations may be resorted to in the details of my device without departing from the spirit thereof.

What I claim as new, is:

1. In a device for transmitting rotary motion; two universal joint units connected in series with one another, each having a pair of axes for rocking motions therearound, the two axes in a pair being perpendicular to one another, and a member in each unit to rock around each axis, the two adjacent members of the two units being permanently secured to one another, and the rocking axes of said two adjacent members being perpendicular to one another, the first outermost member on the one side of the universal joints to receive the driving motion and a second outermost member on the other side thereof to transmit a rotary motion; a first intermediate driving shaft secured to said first outermost member; a second intermediate shaft driven by said second outermost member, said shafts normally being in axial alignment, means to move said shafts out of alignment; a primary driving shaft; a gearing between said primary driving shaft and said first intermediate shaft; an ultimate shaft to be driven through the device; a first intermediate member rotated directly by said primary driving shaft; a second intermediate member rotated by said second intermediate shaft driven by said universal joint units, and means to transmit the difference in rotating speeds of said first and second intermediate members to said ultimate shaft.

2. In a transmission device, having a primary driving and an ultimate driven shaft, operatively connected by said device, a differential gear consisting of three kinetically interdependent elements; a first element being secured on and rotatable with said ultimate driven shaft; a second element secured on and rotatable with said primary driving shaft; a rotatable third element; one of said elements being in geared connection with each of the other two elements; an overrunning clutch including an inner and an outer rotating member being connected with one another by a plurality of intermittently gripping elements; the outer member of said overrunning clutch being in driving engagement with said third element of said differential gear; a floating intermediate shaft being in driving engagement with said primary driving shaft; two universal joints connected in series with one another, having two outermost elements at the two ends thereof, one of said outermost elements being secured to said floating intermediate shaft, and the other outermost element being connected to said inner member of said overrunning clutch.

3. In a transmission device, as set forth in claim 2, a centrifugal governor acting on said floating shaft thereby changing the transmission ratio of said transmission device.

4. In a transmission device, as set forth in claim 2, means to reverse the direction of the gripping action of said overrunning clutch at the desire of the operator and thereby causing a reversal of rotation of said driven shaft from the clockwise to the counterclockwise or vice versa.

5. In a transmission device, as set forth in claim 2, a centrifugal governor acting on said floating shaft thereby changing the transmission ratio of said transmission device, and means to control the action of said governor on said floating shaft at the desire of the operator.

Signed at New York, in the county of New York, and State of New York, this 28th day of November, 1931.

MARCEL PRESSLER.